July 28, 1931. S. F. ACREE 1,816,136
METHOD OF CONVERTING WOOD INTO SUGAR AND OTHER PRODUCTS
Filed March 25, 1920
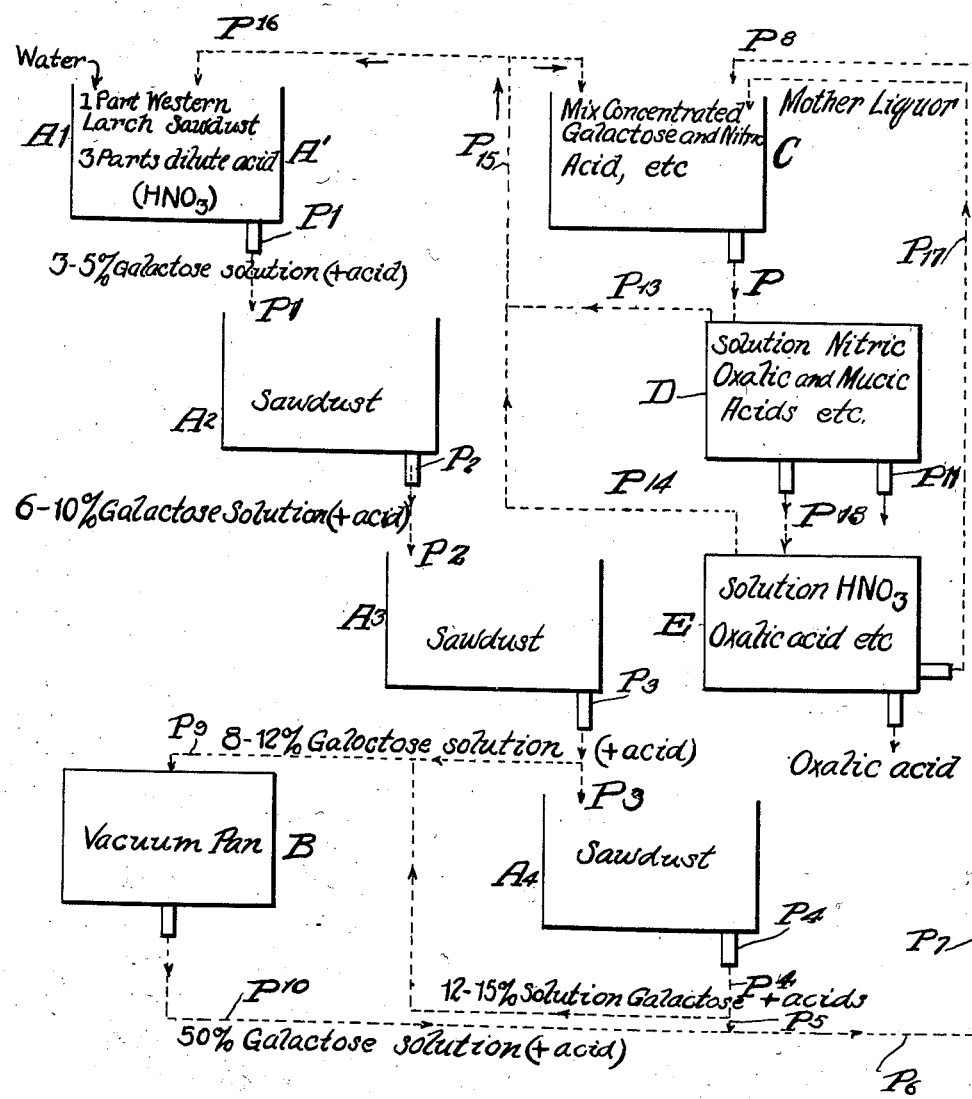

Patented July 28, 1931

1,816,136

UNITED STATES PATENT OFFICE

SOLOMON FARLEY ACREE, OF SYRACUSE, NEW YORK, ASSIGNOR OF ONE-TENTH TO ARTHUR B. FOSTER, OF WASHINGTON, DISTRICT OF COLUMBIA

METHOD OF CONVERTING WOOD INTO SUGAR AND OTHER PRODUCTS

Application filed March 25, 1920. Serial No. 368,640½.

The hydrolysis of cane sugar, maltose, milk sugar or starch, either under the influence of mineral acids or enzymes, has been known and practiced for some time, as also the hydrolysis of still more complex carbohydrates found in various kinds of woods. However, so far as I am aware, the only process of hydrolysis which has been successfully applied heretofore to the treatment of wood is a so-called "dry cook" made by placing the dry wood chips or saw-dust in a digester with approximately an equal amount of water, and with approximately ½ to 2 percent of sulphuric or hydrochloric acid, having reference to the dry weight of the wood. The temperature is then raised to approximately 140° C. to 160° C., by admitting steam, after which the steam and volatile products are blown off, leaving the product relatively dry, whereupon such product is transferred to an extraction battery where the sugar and residual acid are washed out, the latter neutralized, as, for example, with lime, and any resulting precipitate filtered off, leaving the sugar in solution. The latter will consist largely of glucose and other hexoses, with some pentoses, of which substances part only are fermentable, while there is the further disadvantage that the first step has to be carried on under very high pressure, in view of the temperature involved, and the extraction has to be carried out in a separate apparatus. Furthermore, as heretofore practiced, the degree of concentration obtainable has not been suited to production of anything but alcohol. I have applied this process with some success to western larch, but have developed a better one.

The object of the present invention is to provide a process that can be carried on continuously, and that will produce a more highly concentrated solution of the sugar. At the same time I have discovered that it is possible, by my improved process, to work at a temperature below 140° C.–160° C. and in fact only slightly above or even lower than the boiling point of water, thus doing away with the necessity of using high pressure autoclaves for digesting the raw material. In other words I have found that both the hydrolysis of the wood and the extraction of the sugars can be carried out simultaneously in the same vessel in a "wet" or "liquid cook" by treating the wood, preferably in a finely divided state corresponding to sawdust or to shredded chips suitable for making pulp, with two or three times its weight of a dilute hydrolytic and solvent agent at a temperature only slightly above or even below 100° C. By using a continuous extraction battery the sugar solution can be withdrawn from one cell, fortified with more hydrolytic agent when necessary, and used to extract another portion of fresh sawdust and hence raise the concentration of the sugar. By my process the conditions can be made largely specific for certain desirable sugars, as for example, galactose from western larch, the galactose forming sometimes fifty to seventy-five percent of the total sugars. Furthermore these sugars are not so readily decomposed under these conditions. A further improvement comprehended in the present invention relates to the subsequent oxidation of the sugar to form the corresponding dibasic acid and to the utilization of the residual woody material for making cellulosic products such as pulp. To the accomplishment of the foregoing and related ends, said invention, then consists of the steps hereinafter fully described and particularly pointed out in the claims. As it cannot be asked to give all the details of these broader principles, I include in my claims any details of operations, or uses of the products for any purposes, which these disclosures naturally suggest to anyone skilled in the art of using such sugars and organic acids.

The annexed drawing and the following description set forth in detail one approved method of carrying out the invention, such disclosed mode, however, constituting but one of the various ways in which the principle of the invention may be used.

The accompanying drawing represents, in a very diagrammatic way, the steps of carrying out the process and referring to said drawing A1, A2, A3 and A4, represent any suitable number of leaching vats, these being arranged if desired on successively lower levels in order that the liquors may flow by gravity from one leach to the next in the series. It is assumed that the leach A4, has been freshly charged with western larch in a comminuted form, say in the form of sawdust. The hot liquid, say constituting a slightly acid solution of galactose and containing say 8 to 12% of galactose is run from A3 into A4. Then the hot liquor from A2 is run into A3 and then the hot liquor from A1 is run into A2. The sawdust in A1 can now be washed with wash-water to remove any remaining galactose and acid, and the sawdust can then be dumped out of A1 which is then ready to be recharged either with sawdust from A2 already partly leached, or with fresh sawdust and may become the last leach in the series.

As indicated pipes P1, P2, P3 and P4 can be used for carrying the liquors through the series of leaches, it being understood that suitable valves or plugs are provided in the various pipes or conduits shown in the drawing.

The liquor leaving the last leach of the series may travel through pipes P4, P5, P6, P7 and P8 into the vessel C (consisting of one or more towers or tanks) or liquor from the last unit or from any unit of the leaching system may pass through pipe P9 into the vacuum pan B or other suitable concentrator for being concentrated to the desired extent, for example up to 50% galactose, which solution may pass through pipe P10 into pipe P6, etc. as indicated above. Or it may be concentrated to a solid or paste or taffy, in this stage. In the tank, tower or other device C, the galactose is treated with $HNO_3$ and oxides of nitrogen.

The concentrated galactose and nitric acid mixture may be passed from the tank C through pipe P into the principal reaction vessel D, and it may be heated therein, air being blown through the same if desired, to cause the nitric acid to act upon the galactose and other sugars to form mucic and oxalic acids. The liquid therein then being cooled or being cooled during its passage through this tank or reaction vessel of system of pipe, causes the mucic acid to largely crystallize or precipitate in the liquor, this mucic acid being removed for example by P11, for any subsequent purification which may be desired.

The remaining solution may contain a sufficient amount of oxalic acid to warrant a recovery of the same at this stage, and if so the said liquor is passed by the pipe P18, into the oxalic acid crystallizing tank E, in which the oxalic acid can be crystallized or otherwise removed from the solution.

The gases and vapors from D and E may pass either from the tank D through pipe P13 or from the tank E through pipe P14, into the pipe P15, pipe P16 and back into the leaching system or to device C, for utilization. The mother liquor from E can pass through pipe P17 back to receptacle or tower C if desired.

Altho in the claims in this application I speak only of western larch, it is understood that I include any other suitable woody or vegetable materials.

As just indicated, by way of illustration, I shall describe my improved process as applied to the treatment of the particular kind of wood named, viz., western larch, although other larches are known as suitable, and for that matter any wood or cellulosic substance containing carbohydrates of the kind hereinafter referred to may be utilized in my process or method. For example, corn cobs, corn shucks, and cotton seed hulls contain considerable quantities of xylans which upon hydrolysis yield the pentose sugar, laevo-xylose; this sugar gives trioxyglutaric acid upon oxidation by the methods hereafter described. It has been found that this particular tree, and particularly the butt portion, which constitutes the residue best available for use in a process of this sort, contains an unusually large portion (15 to 18 percent of the dry weight of the wood, as compared with 8 to 10 percent in the body of the same tree) of a complex carbohydrate, to which the term "galactan" has been applied, for the reason that it may be converted into the hexose known as galactose. Galactose, as is also shown, yields, upon oxidation, a polyhydroxy dibasic acid known as mucic acid.

This galactan may be extracted with water, although very slowly, and so far as I am aware the only attempts made heretofore to utilize it directly, even experimentally, have involved its preliminary extraction and segregation from the resulting solution. In one of my plans, the galactan is extracted from the wood with water, the natural acids of the wood such as tannins and other materials assisting in the hydrolysis and solution of such galactan; the solution is then boiled and concentrated, or further acidified and concentrated to hydrolyze the galactan into the galactose which is then used for making mucic acid and other products.

According to my present improved process, however, I employ only one step to hydrolyze such galactan or other galactose-bearing compounds and extract the resultant product directly from the wood, obtaining a solution of galactose in a relatively high degree of concentration. From such a solution the sugar in question may, if desired, be readily separated out, or, by further appropriate treatment, as will be hereafter described, such sugar may be easily fermented into ethyl alcohol, or acetone and butyl alcohol, or organic acids or other products, or may be readily oxidized into mucic acid, which may be substituted for tartaric acid in many important fields of use, such as the dyestuff industry, and which in fact has been found preferable to such last named acid for certain purposes, for example, in baking powder compounds. Mucic acid is also equally satisfactory with, if not preferable to, citric acid in many of the compounds or mixtures in connection with which such last named acid is employed, such as effervescents, and flavoring materials in ices, candies, drinks and jellies.

Having regard first to the hydrolysis of the wood, specifically the western larch referred to above, I preferably take one part of wood in the form of shredded chips or sawdust, and add thereto about three parts, by weight, of water containing a suitable hydrolytic agent such as an acid in amount equal to one-quarter ($1/4$) to two and one-half ($2 1/2$) per cent of the dry weight of such wood. In such a mixture the sawdust is preferably entirely covered by the hydrolytic solution and subjected to its action, and the resultant sugar can be drained or pumped away readily from the sawdust, which can then be treated again with a more dilute solution from another cell, or with fresh hydrolytic agent, or with water for washing. Sulphuric acid may be employed as the hydrolytic agent and afterwards neutralized with lime and calcium carbonate. This procedure causes the precipitation of dark tannin-like bodies and greatly clarifies the solution, which can then be freed of the precipitate by settling, filtering, or centrifuging, and which can then be boiled in open or vacuum pans without appreciable caramelization and can be concentrated into a very thick molasses of say 80% sugar content or into a paste or taffy. This molasses or taffy can be easily stored or shipped in tank cars having steam coils, and at the destination can be heated and diluted till fluid enough to run out of the tank car rapidly. The use of other well known clarifying agents such as decolorizing charcoals has been found of help. The clarified molasses and taffy are useful for carbohydrate food for humans and animals and lower organisms, and for many other purposes for which such sugars are employed. An excellent cattle food is made by mixing such sugars with proper proportions of cotton seed meal or cake, soy-bean cake or other highly nitrogenous food stuffs. The mucic acid made from such clarified solution of galactose is very white when washed and properly treated, and of such fine quality as not to need further crystallization or purification for many uses.

I have used as hydrolytic agents sulphurous, phosphoric and hydrochloric acid, and even alkaline agents, but I preferably use sulphuric acid or an organic or inorganic acid recovered in the manufacture of mucic acid, such as saccharic acid, oxalic acid, or even mucic acid, and especially a mixture of nitric and nitrous acids, or more exactly $HNO_3$ plus $HNO_2$ plus $NO$ plus $NO_2$, etc., contained in the recovered nitric acid or in the "mother liquors" resulting from separation of the crude mucic acid from the oxidized sugar solution, or in other liquors obtained in the manufacture of mucic acid. Moreover, chlorine alone, or with hydrochloric acid may be used, as well as bromine, these, equally with the nitric and nitrous acids, and the saccharic, oxalic and mucic acids previously named, being recoverable in large part in the subsequent production of mucic acid from the galactose and so capable of use over and over again. Sulphurous acid salts such as calcium bisulphite may be used at the proper temperature for the double purpose of hydrolyzing and extracting the galactose compounds and of giving a cellulosic residue suitable for making sulphite pulp and paper and other products by proper treatment and bleaching. The western larch fibres are strong, tho somewhat short, and I have made good grades of pulp and paper from western larch by the sulphate, soda, sulphite and ground-wood processes, and particularly recommend the extraction of the galactose compounds from the larch chips with dilute acids at such temperatures and in such manner as not to form undue amounts of hydro-cellulose and other objectionable compounds, to the end that I then use the residual extracted chips for making ground-wood pulp, or fibre board and the like, or the above mentioned chemical pulps of fair quality.

The mixture of wood and hydrolytic solution just described may be heated in a suitable extraction vessel, e. g., in one of a series of upright, stationary, self-filling and self-dumping continuous extraction batteries, and is maintained, by injecting steam by steam-coil heating or by any other suitable means, at a temperature preferably of from about 70° C. to 100° C. One approved method is to heat the fresh sawdust or chips to about 100° C. in rotary kilns or by steam before it is run into extraction cells, or to steam-heat the sawdust with or without hydrolytic agent after it is passed into the cell, and then run in the dilute hydrolytic agent which has been preheated in any desired manner; as for example by passage through steam-jacketed pipes. In other words, the mixture is not necessarily raised above the boiling point of water (100° C), but when it is desired to increase the rate or extent of hydrolysis, it is understood that I may raise the temperature to 110° C., 120° C., or even to 140° C., or higher by having sufficient pressure to keep the water and solution largely in a liquid state covering the wood. This treatment at about 100° C. will in approximately one hour convert the complex carbohydrate in the larch into soluble galactose and other products, the sugar in question forming about a three to six per cent solution with the water that is present, and constituting 30 to 75 per cent or more of the total sugars. From the first vessel (see the drawing) this solution may then be drained off, fortified with more hydrolytic agent when desired, and added to sawdust in a second vessel, the proportions being maintained approximately the same, and the new mixture heated as before, with the result that a further quantity of galactan in such second quantity of sawdust is hydrolyzed into galactose, thereby forming a five to ten per cent solution of the latter. The operation last described may then be repeated with a third quantity of sawdust or wood in suitable form for treatment, and so on until if desired, a solution is obtained containing the highest practicable per cent of the galactose. The operation is preferably made continuous in an extraction battery system by discarding the spent sawdust or chips for use as fuel or for making pulp and cellulose products, especially when sulphurous acid and its salts have been used as the hydrolytic agents, and replacing such spent wood with fresh sawdust or chips in the usual manner. In other words, the fresh hydrolytic agent first enters the sawdust which has been extracted the largest number of times and passes through all the other cells successively, including finally the fresh unhydrolyzed sawdust, the resulting concentrated sugar solution then being used for the production of mucic acid, for example. Following the draining off of the solution from the first cell in which the hydrolyzing and extracting step is thus carried on, the residue of the wood is preferably washed to remove any adhering solution of galactose and acid, the weak solution thus obtained being preferably used, generally after the addition of more hydrolytic agent, as the extraction liquor for the next series of treatments of the wood in the battery. Also it should be noted that the first part of the liquor passing through the wood at any stage will be more concentrated than that which passes through last, and if kept separate such first part may be transferred immediately to a later stage in the process. The first cell of this preceding battery is then emptied and refilled with fresh sawdust and becomes the last cell of the new battery. The final extracted wood has a high cellulose content and this spent wood can be used for fuel, or for making pulp and paper, or cellulose and its products, or any other suitable product.

In general, I have found a three-cell or four-cell battery very satisfactory in this process, but more cells can be used. One cell is consequently out of the cycle while it is being emptied of fully extracted wood and filled with fresh sawdust or chips. The liquid can be circulated nearly constantly upward or downward through the cells or can be allowed to stand in the cell for specified times and then pumped into the next cell or into a storage container. In general, the hydrolytic agent remains from thirty to ninety minutes with the wood in each cell, one hour being a good time period. Three or four extractions of one hour each at about 100° C. will remove practically all of the galactose and other sugars desirable in my processes. Simple circulation of the liquors is very efficacious in forming and removing the desired sugars, but a somewhat better method is to remove the hot liquid from the cell and evacuate the cell and then pump the next hydrolytic solution into the evacuated cell. By this procedure the hot solution within the cells and pores of the chips or sawdust is caused to boil at the diminished pressure and force itself out of the wood so that the wood drains more quickly and is left porous and practically free of the more concentrated solution formed within the wood particles. The hot liquor from the preceding cell is then pumped into the evacuated cell and into the evacuated porous wood particles and consequently fills the porous wood particles with a weaker sugar solution containing hydrolytic agent and gives higher efficiency in the succeeding hydrolysis of the wood. This procedure is particularly applicable when a cell is filled with fresh chips or sawdust; whether such fresh sawdust has been air-heated or steam-heated outside or inside the extraction cell, the subsequent evacuation removes water and leaves the fresh wood much more porous and more capable of absorbing the next sugar solution forced into the evacuated cell and wood particles. After such fresh chips or sawdust particles undergo hydrolysis the sugar solution drained and pumped or evacuated therefrom is concentrated enough for many purposes, such as making mucic acid or alcohol. When sufficient cells are used to make this evacuation method undesirable, the fresh sawdust or chips and the steam, or hydrolytic agent from the preceding cell, can be added simultaneously to the "fresh sawdust cell" to save some time.

In the foregoing described steps, the small quantity of organic or inorganic acid present in the sugar solution apparently acts as a catalytic agent in hydrolyzing the galactan and so some acid is still left in the solution after the last treatment in the series. When sulphuric acid is used as the hydrolytic agent it can be neutralized partially with lime and finally with calcium carbonate as described above, especially when the resulting sugar is to be fermented. This procedure is also preferable, tho not absolutely necessary when mucic acid is to be made from the sugar. In some cases, as indicated above, I use nitric acid or "mother liquors" containing nitric acid, nitrous acid, oxalic acid, saccharic acid, and mucic acid and its lactones, and other acids, or I may use the condensate coming from the evaporations and concentration of the sugar solutions in the vacuum pans, which condensate contains volatile organic acids and nitrous and nitric acids. Of course, these various solutions containing nitric acid may also be mixed in any desired proportions. This nitric acid or acid mixture is generally kept in the sugar solution used for the subsequent manufacture of mucic acid but may be recovered, or eliminated, in any well known way. For example, it sometimes happens that the concentration of the galactose or other sugars in the final extracts from the above mentioned extraction batteries may not be sufficiently high for certain specific purposes. In such a case it becomes necessary to concentrate the sugar solution by evaporation in open pans or vacuum pans. Besides these sugars and other carbohydrates and the nitric and nitrous acid, for example, when they are used for the hydrolysis, there are formed and extracted other substances such as tannic acid and acetic acid, and perhaps other organic acids. If the acids present attack the material of the pans the erosion can be greatly reduced by adding sufficient alkaline agent to neutralize the stronger acids, such as nitric acid, for example, the weak organic acids having much less effect. I particularly recommend this partial neutralization when the tubes, tube head plates, or bodies of the vacuum pans are made of brass, copper or cast iron or other material attacked by strong acids. The weak organic acids do not attack these materials readily but if desired the total strong and weak acids can be neutralized and the erosion very greatly reduced. The alkaline nitrate formed by the neutralization of the nitric acid, for example, will not interfere with the concentration of the sugar solution and the oxidation of galactose to mucic acid, for example, and can be recovered in subsequent operations and converted back into nitric acid by distillation with sulphuric acid.

The resultant solution, whichever specified series of steps is followed, will be comparatively light in color instead of being very dark, as is the corresponding product in the present commercial process hereinbefore referred to, and while the sugar present has been called galactose, it will be understood that I do not mean thereby to imply that it is all pure galactose, but merely that the original complex carbohydrates of the wood have been broken down into galactose and other intermediate forms of galactan which are amenable to further hydrolysis and to oxidation in a subsequent stage of the process. Furthermore, it is not meant to imply by the use of the word "sugar" in the claims that only galactose is formed, for some glucose, pentoses, organic acids, tannins, etc., may result from the hydrolysis and extraction of other substances in the wood. Finally it is to be noted that the degree of concentration of the sugar and hydrolytic agent referred to above is suggestive rather that prescriptive.

By my improved method of converting woody or cellulosic materials into sugars and other products I avoid the use of high pressure autoclaves which are expensive to install, operate and repair, and avoid the expense of the labor and special machinery needed in moving the sawdust and hydrolytic agent into and out of the autoclaves over to and into the extraction batteries. I furthermore very materially shorten the time and lower the expense of the complete operation and escape the danger of breakdowns when I omit the use of high pressure autoclaves for hydrolysis. Because of the much lower temperature and more dilute hydrolytic agent employed in my process, as contrasted with existing ones, the residue of wood chips is useful for making ground wood pulp or chemical pulp of fair grade. Through my process I have discovered and developed a new, very large, cheap and important source of a new scientific and commercial product; namely a waste product, western larch butt logs, as the source of a very large quantity of a new sugar mixture containing as high as seventy five percent of galactose and galactose bearing compounds. This sugar mixture is a useful food for animals and lower organisms. I have discovered that this galactose and the glucose-like compounds can be fermented by special yeasts to the extent of 90–95 percent into ethyl alcohol and carbon dioxide which makes my process and sugar mixtures much better than the present ones for making alcohol from wood. Furthermore, this new sugar mixture is a new, cheap, and plentiful source of materials for making chemicals which are specific products of galactose; for example, the galactose is readily oxidized by bromine, air and catalyzers, or nitric acid into mucic acid, and the glucose-like sugars, and others, yield saccharic, oxalic, and other similar acids. I have found that this mucic acid is a valuable substance for making baking powders, effervescents, dyestuffs, and mordants, flavoring materials for soft drinks, candies, ices and jellies, and can be readily converted into the more soluble allomucic acid, dehydromucic acid and other products which have specific uses.

It must not be understood that I intend to limit the application of my process or my claims to wood as popularly understood but include any suitable substances of woody or vegetable structure, such as cottonseed hulls, corncobs, cornshucks, leaves of plants, cocoanut shells, cohune nut shells, peanut shells, hulls of various nuts, ivory nut meal and all similar substances.

Other modes of applying the principle of my invention may be employed instead of the one explained, change being made as regards the method herein disclosed, provided the step or steps stated in any one of the folowing claims or the equivalent of such stated step or steps be employed.

I therefore particularly point out and distinctly claim as my invention:—

1. The method of converting western larch into sugar, which consists in treating the same with water and sulphuric acid below 140° C.

2. The method of converting wood into sugar, which consists in treating the same with water and sulphuric acid below 100° C.

3. The method of converting western larch into sugar, which consists in treating one part of western larch below 140° C. with approximately three parts of water containing sulphuric acid in amount less than 6 per cent of the dry weight of such western larch, removing the solution from such western larch, and neutralizing the sulphuric acid.

4. The method of converting western larch into sugar, which consists in treating one part of western larch below 140° C. with approximately three parts of water containing sulphuric acid in amount less than 6 per cent of the dry weight of such western larch, removing the solution from such western larch, and neutralizing the sulphuric acid.

5. The method of converting western larch into sugar, which consists in treating one part of western larch below 100° C. with approximately three parts of water containing sulphuric acid in amount less than 6 per cent of the dry weight of such western larch, removing the solution from such western larch, and neutralizing the sulphuric acid.

6. The method of converting western larch into sugar, which consists in treating one part of western larch below 100° C. with approximately three parts of water containing sulphuric acid in amount less than 6 per cent of the dry weight of such western larch, removing the solution from such western larch, and neutralizing the sulphuric acid by first adding lime in amount insufficient for complete neutralization, followed by adding calcium carbonate in excess.

7. In a battery process of the character described, the steps which consist in treating a quantity of western larch in the presence of water with a hydrolytic agent which is active in the hydrolysis of galactan, drawing off the resulting sugar solution with residual hydrolytic agent, and then treating a second quantity of such western larch with such solution, and so on until a solution of desired degree of concentration is obtained by hydrolyzing the fresh wood in the last cell, and removing the sugar solution from such last cell, and concentrating the sugar solution to at least a thick molasses.

8. As a new composition of matter, a mixture of hydrolyzed galactan, galactose, glucose, pentoses, and tannin materials obtained by treating one part of western larch with about three parts of water and a hydrolytic agent below 140° C., drawing off in solution the resulting sugar with residual hydrolytic agent, treating a fresh quantity of wood with such solution, drawing off the resulting sugar solution with residual hydrolytic agent, thereafter rendering the hydrolytic agent ineffective, and further concentrating the liquid.

9. As a new composition of matter, a concentrated western larch extract produced by the process of extracting comminuted western larch wood with a solvent, separating such wood from such extract, and removing the solvent from such extract to form a concentrated western larch extract such extract containing not substantially below 80% of solid matter.

10. A process which comprises leaching western larch with an aqueous liquid containing a hydrolytic agent capable of hydrolyzing galactan, then rendering at least a part of said hydrolytic agent inactive toward such solution.

11. A product consisting of the hydrolyzed extract of western larch, containing galactose and a much smaller amount of other sugars, concentrated to at least the consistency of a thick molasses.

12. A method of treating wood of a variety which contains a substantial amount of galactan, which comprises subjecting such wood to the action of hot water containing a small percentage of sulphuric acid and maintaining such materials at below 100° C., during such treatment, whereby the galactan is hydrolyzed.

13. A process of obtaining valuable products from the waste portions of western larch which comprises subjecting such western larch, in a comminuted state, to digestion in water containing an acid capable of acting as a hydrolytic agent to convert galactan into galactose, thereby forming a solution containing galactose and other soluble constituents of said western larch, neutralizing at least a part of such acid, thereby leaving a liquor suitable for a fermentation operation.

SOLOMON FARLEY ACREE.